(12) United States Patent
Kim et al.

(10) Patent No.: US 9,784,225 B2
(45) Date of Patent: Oct. 10, 2017

(54) INTAKE AIR CONTROL APPARATUS OF ENGINE

(71) Applicant: HYUNDAI MOTOR COMPANY, Seoul (KR)

(72) Inventors: Hyoung Hyoun Kim, Hwaseong-si (KR); JongMan Jun, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 126 days.

(21) Appl. No.: 14/815,876

(22) Filed: Jul. 31, 2015

(65) Prior Publication Data

US 2016/0090951 A1    Mar. 31, 2016

(30) Foreign Application Priority Data

Sep. 30, 2014    (KR) .......................... 10-2014-0131641

(51) Int. Cl.
*F02D 9/08*    (2006.01)
*F02M 35/10*    (2006.01)
*F02M 35/108*    (2006.01)

(52) U.S. Cl.
CPC .. *F02M 35/10255* (2013.01); *F02M 35/1085* (2013.01); *F02M 35/10098* (2013.01); *Y02T 10/146* (2013.01)

(58) Field of Classification Search
CPC .......... F02M 35/10255; F02M 35/1085; Y02T 10/146
USPC ................................................. 123/308, 432
See application file for complete search history.

(56) References Cited

U.S. PATENT DOCUMENTS

| 4,494,504 | A | * | 1/1985 | Yagi | ........................ | F02B 17/00 |
| | | | | | | 123/308 |
| 4,520,775 | A | * | 6/1985 | Nakamura | ............ | F02F 1/4214 |
| | | | | | | 123/184.45 |
| 4,545,347 | A | * | 10/1985 | Morikawa | ............... | F02B 29/02 |
| | | | | | | 123/308 |
| 4,660,530 | A | * | 4/1987 | Sugiyama | ............... | F02B 27/02 |
| | | | | | | 123/184.42 |

(Continued)

FOREIGN PATENT DOCUMENTS

| JP | 2003-003855 A | 1/2003 |
| JP | 2012-202328 A | 10/2012 |

(Continued)

*Primary Examiner* — Marguerite McMahon
(74) *Attorney, Agent, or Firm* — McDermott Will & Emery LLP (57) ABSTRACT

An intake air control apparatus of an engine includes an Intake manifold configured to guide intake air into a plurality of engine cylinders. A plurality of first intake air passages communicate with the cylinders. A plurality of second intake air passages are disposed in parallel with the first intake air passages and communicate with the cylinders. An Intake throttle shaft passes through the first intake air passages. An intake air throttle valve is disposed inside the first intake air passages, rotates with the Intake throttle shaft, and opens/closes the first intake air passage. A swirl throttle shaft passes though the second intake air passages. A swirl throttle valve is disposed inside the second intake air passages, rotates together with the swirl throttle shaft, and opens/closes the second intake air passages. An actuator rotates selectively the Intake throttle shaft and the swirl throttle shaft. A controller controls the actuator.

18 Claims, 8 Drawing Sheets

(56) References Cited

U.S. PATENT DOCUMENTS

| | | | | |
|---|---|---|---|---|
| 5,273,014 A * | 12/1993 | Mitobe | .................... | F02B 31/00 |
| | | | | 123/308 |
| 5,329,912 A * | 7/1994 | Matsumoto | ........... | F02F 1/4214 |
| | | | | 123/308 |
| 5,379,743 A * | 1/1995 | Stokes | .................. | F02B 31/085 |
| | | | | 123/308 |
| 5,592,917 A * | 1/1997 | Kim | ...................... | F02B 31/085 |
| | | | | 123/308 |
| 5,765,525 A * | 6/1998 | Ma | .......................... | F02B 31/04 |
| | | | | 123/308 |
| 5,960,769 A * | 10/1999 | Mashiki | ................ | F02B 23/104 |
| | | | | 123/295 |
| 6,722,344 B2 * | 4/2004 | Ashida | .................... | F02B 17/00 |
| | | | | 123/308 |
| 8,020,539 B2 * | 9/2011 | Maunoury | ....... | F02M 35/10032 |
| | | | | 123/302 |
| 8,141,537 B2 * | 3/2012 | Uda | ........................ | F02B 31/06 |
| | | | | 123/306 |

FOREIGN PATENT DOCUMENTS

| | | |
|---|---|---|
| KR | 1999-0027352 U | 7/1999 |
| KR | 10-2009-0052206 A | 5/2009 |

* cited by examiner

INTAKE AIR CONTROL APPARATUS OF ENGINE

CROSS-REFERENCE TO RELATED APPLICATION

This application claims the benefit of priority to Korean Patent Application No. 10-2014-0131641 filed in the Korean Intellectual Property Office on Sep. 30, 2014, the entire contents of which are incorporated herein by reference.

TECHNICAL FIELD

The present disclosure relates to an intake air control apparatus of an engine, and more particularly, to an intake air control apparatus of an engine which may guide swirl of intake air.

BACKGROUND

An internal combustion engine is generally powered by energy which is generated when a mixed gas is combusted in a combustion chamber. Here, the mixed gas includes air and a fuel. An intake passage, through which the mixed gas or air to be mixed with a fuel is supplied, is connected to a cylinder of the engine.

In recent years, research on guiding a swirl flow by controlling the amount of intake air of at least one of two intake air passages in a state where the two intake air passages are connected to one cylinder and development of an apparatus for the same have been developed.

The swirl represents a vortex phenomenon occurring in the combustion chamber during the intake of the mixed gas or air, and when swirl with a predetermined magnitude occurs, an ignition state may be enhanced and combustion efficiency may be improved.

However, in a case where a configuration of an apparatus for guiding the swirl flow is complicated, manufacturing cost and weight increase, and fuel efficiency decreases.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide an intake air control apparatus of an engine wherein a configuration is simple, and cost may be saved. Further, according to the intake air control apparatus of the present disclosure, weight may be decreased and fuel efficiency may be improved.

According to an exemplary embodiment of the present inventive concept, an intake air control apparatus of an engine includes an Intake manifold guiding intake air into a plurality of cylinders of the engine. A plurality of first intake air passages communicate with each of the cylinders with the Intake manifold. A plurality of second intake air passages are disposed in parallel with the first intake air passages and communicate with each of the cylinders with the Intake manifold. An Intake throttle shaft passes through each of the first intake air passages. An intake air throttle valve is disposed inside the first intake air passages, rotates together with the Intake throttle shaft, and opens and closes the first intake air passage. A swirl throttle shaft passes though the plurality of second intake air passages. A swirl throttle valve is disposed inside the second intake air passages, rotates together with the swirl throttle shaft, and opens and closes the second intake air passages. An actuator is configured to rotate selectively the Intake throttle shaft and the swirl throttle shaft to open or close the first intake air passages or the second intake air passages. A controller is configured to control the actuator.

When the swirl throttle valve closes the second intake air passages and the intake air throttle valve has opened the first intake air passages based on the operation of the actuator, a swirl may occur by the intake air which is supplied only through the second intake air passages to the cylinders.

The intake air control apparatus may further include a swirl gear shaft disposed at one end portion of the swirl throttle shaft or is disposed to be concentric to the swirl throttle shaft. The swirl gear shaft may rotate integrally together therewith and be independently operated by a driving force of the actuator. An intake air gear shaft may be disposed at one end portion of the Intake throttle shaft or disposed to be concentric to the Intake throttle shaft. The intake air gear shaft may rotate integrally together therewith and be dependently operated by the rotation of the swirl gear shaft. A stopper may limit the rotation of the intake air gear shaft.

The swirl gear shaft and the intake air gear shaft may have cylindrical shapes. Gear teeth may be formed along an outer circumferential surface of the swirl gear shaft corresponding to an angle of 90° on the outer circumference surface of the swirl gear shaft. Gear teeth may be formed along a first portion of an outer circumferential surface of the intake air gear shaft corresponding to a predetermined angle on the outer circumference surface of the intake air gear shaft. Gear teeth may be further formed along a second portion at a predetermined spaced-apart distance from the first portion. The intake air gear shaft may rotate since the swirl gear shaft rotates while the gear teeth of the swirl gear shaft are engaged with the gear teeth of the first portion or the second portion of the intake air gear shaft.

When both the first intake air passage and the second intake air passage are open, a side end portion of the gear teeth of the swirl gear shaft at a clockwise direction may be disposed to contact a side end portion of the gear teeth of a first portion of the intake air gear shaft at the clockwise direction. The gear teeth of a second portion of the intake air gear shaft may be disposed to be spaced apart by a predetermined distance in the clockwise direction from the gear teeth of the first portion of the intake air gear shaft. A side end portion of the gear teeth of the second portion of the intake air gear shaft at the clockwise direction may be disposed to contact the stopper.

The first intake air passage is open and the second intake air passage is closed since the swirl gear shaft rotates by 90° in the counterclockwise direction and both the first intake air passage and the second intake air passage are open.

The gear teeth of the swirl gear shaft may rotate and may be disengaged with the gear teeth of the intake air gear shaft thanks to a spaced-apart distance between the gear teeth of the first portion of the intake air gear shaft and the gear teeth of the other portion, when the swirl gear shaft rotates in the counterclockwise direction.

When the swirl gear shaft rotates by 90° in the clockwise direction and both the first intake air passage and the second intake air passage are open, both the first intake air passage and the second intake air passage are closed since the intake air gear shaft rotates by 90° in the counterclockwise direction and the gear teeth of the swirl gear shaft push away the gear teeth of the first portion of the intake air gear shaft and are engaged with the gear teeth of the second portion.

The swirl gear shaft and the intake air gear shaft may return to initial positions, in which both the first intake air passage and the second intake air passage are open, by the driving force of the actuator when the swirl gear shaft and the intake air gear shaft rotate to a position different from the initial positions.

The swirl gear shaft and the intake air gear shaft may return to initial positions, in which both the first intake air passage and the second intake air passage are open, by the return spring when the driving force of the actuator is released when the swirl gear shaft and the intake air gear shaft rotate to a position different from the initial positions.

The return spring may include one return spring returning the swirl gear shaft to the initial position, and another return spring returning the intake air gear shaft to the initial position.

The one return spring may be fixed at the stopper and be connected to a shortest distance portion of the swirl gear shaft from the stopper in the initial position state of the swirl gear shaft, and the other return spring may be fixed at the stopper and be connected to a shortest distance portion of the intake air gear shaft from the stopper in the initial position state of the intake air gear shaft. The one return spring may be tensioned since the swirl gear shaft rotates to a position different from the initial position and to be contracted since the driving force of the actuator is released, thereby returning the swirl gear shaft to the initial position, and the other return spring may be tensioned since the intake air gear shaft rotates to a position different from the initial position and to be contracted since the driving force of the actuator is released, thereby returning the intake air gear shaft to the initial position.

The one return spring may be a torsion spring wound around the swirl gear shaft and allow the swirl gear shaft to turn to the initial position since the driving force of the actuator is released when the swirl gear shaft rotates to a position different from the initial position. The other return spring may be a torsion spring wound around the intake air gear shaft and return the intake air gear shaft to the initial position since the driving force of the actuator is released as the intake air gear shaft rotates to a position different from the initial position.

The swirl gear shaft and the intake air gear shaft return to the initial positions, in which both the first intake air passage and the second intake air passage are open, when the swirl gear shaft and the intake air gear shaft rotate to a position different from the initial positions. The stopper may contact the side end portion of the gear teeth of the second portion of the intake air gear shaft and limit the rotation of the intake air gear shaft. The side end portion of the gear teeth of the first portion of the intake air gear shaft may contact the side end portion of the gear teeth of the swirl gear shaft and limit the rotations of the swirl gear shaft.

The swirl gear shaft and the intake air gear shaft may have cylindrical shapes. Gear teeth may be formed along an outer circumferential surface of the swirl gear shaft corresponding to an angle of 90° on the outer circumference surface of the swirl gear shaft. Gear teeth may be formed along an outer circumferential surface of the intake air gear shaft corresponding to an obtuse angle on the outer circumference surface of the intake air gear shaft. The intake air gear shaft may rotate since the swirl gear shaft rotates when the gear teeth of the swirl gear shaft are engaged with the gear teeth of the intake air gear shaft.

When both the first intake air passage and the second intake air passage are open, the side end portion of the gear teeth of the swirl gear shaft may contact the side end portion of the gear teeth of the intake air gear shaft, and the side end portion of the gear teeth of the intake air gear shaft may contact the stopper.

When the first intake air passage is open and the second intake air passage is closed and the swirl gear shaft rotates by 90° in the counterclockwise direction when the first intake air passage and the second intake air passage are open.

The gear teeth of the swirl gear shaft may rotate and disengaged with the gear teeth of the intake air gear shaft when the swirl gear shaft rotates in the counterclockwise direction.

When the swirl gear shaft rotates by 270° in the counterclockwise direction and both the first intake air passage and the second intake air passage are open, both the first intake air passage and the second intake air passage are closed and the intake air gear shaft rotates by 90° in the counterclockwise direction since the swirl gear shaft further rotates by 90° in the counterclockwise direction as the gear teeth of the swirl gear shaft start being engaged with the gear teeth of the intake air gear shaft and the swirl gear shaft rotates by 180° in the counterclockwise direction.

DETAILED DESCRIPTION OF THE EMBODIMENTS

An exemplary embodiment of the present inventive concept will hereinafter be described in detail with reference to the accompanying drawings.

Figure 1:
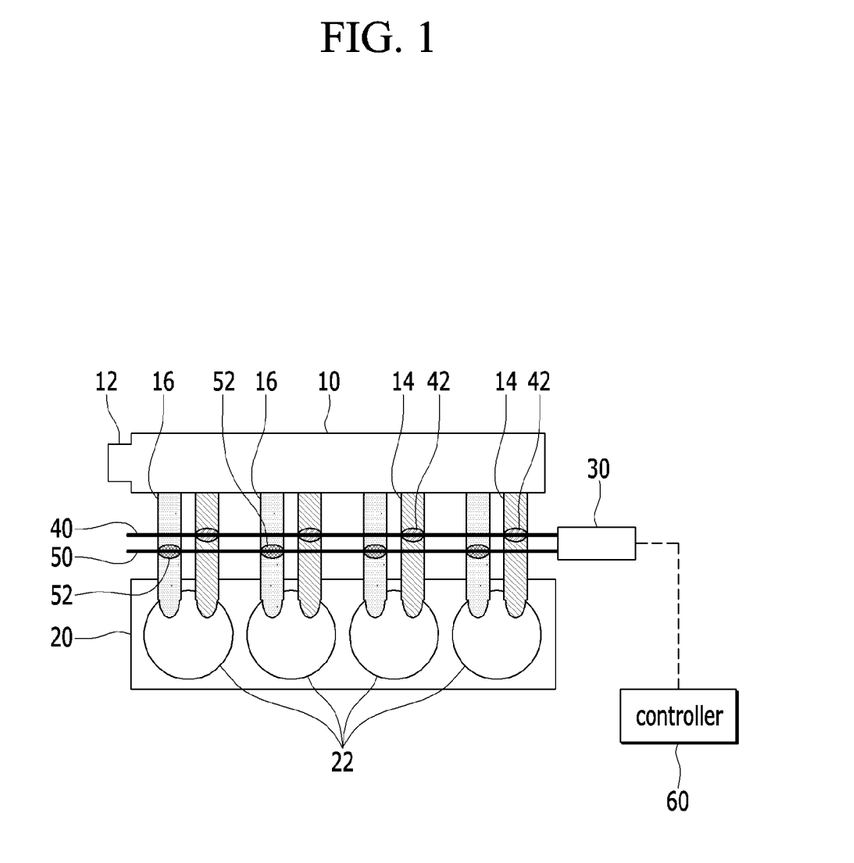
FIG. 1 is a view illustrating a configuration of an intake air control apparatus of an engine according to an exemplary embodiment of the present inventive concept.

FIG. 1 is a view illustrating a configuration of an intake air control apparatus of an engine according to an exemplary embodiment of the present inventive concept.

Referring to FIG. 1, the intake air control apparatus according to an exemplary embodiment of the present inventive concept includes an Intake manifold 10, intake air passages 14 and 16, an Intake throttle shaft 40, an intake air throttle valve 42, a swirl throttle shaft 50, a swirl throttle valve 52, an actuator 30, and a controller 60.

The Intake manifold 10 is a passage for guiding the mixed gas or air to each cylinder 22 of the engine. Here, the mixed gas or air inputted into the engine is called intake air. In addition, the Intake manifold 10 includes an inlet port 12 for receiving the intake air inside the Intake manifold 10. The air throttle valve 42 adjusting the amount of the inputted intake air is installed at the inlet port 12 of the Intake manifold 10, but a typical conventional air throttle valve is omitted from the inlet port 12 of the Intake manifold 10.

The intake air passages 14 and 16 are branched from the Intake manifold 10 and communicate with the Intake manifold 10 and the cylinder 22. In FIG. 1, a configuration where two intake air passages 14 and 16 communicate respectively with each of the four cylinders 22 disposed at a cylinder block 20 is illustrated, but such a configuration of the intake air control apparatus according to the exemplary embodiment of the present inventive concept is not limited to a four-cylinder engine.

Here, any one of the two intake air passages 14 and 16 communicating with one cylinder 22 is called a first intake air passage 14, and the other one is called a second intake air passage 16. The plurality of first intake air passages 14 and second intake air passages 16 may be disposed in parallel with each other toward the corresponding cylinders.

The Intake throttle shaft 40 has a rod shape with a predetermined length and is disposed across the first intake air passage 14 while passing through the first intake air passage 14.

The intake air throttle valve 42 is rotatably connected to the Intake throttle shaft 40 and has a plate shape of which a surface corresponds to a cross-section of the first intake air passage 14. Furthermore, the intake air throttle valve 42 is disposed at the first intake air passage 14 and opens and closes the first intake air passage 14 while rotating together with the Intake throttle shaft 40 about the Intake throttle shaft 40.

The swirl throttle shaft 50 has a rod shape with a predetermined length. In addition, the swirl throttle shaft 50 is disposed in parallel with the Intake throttle shaft 40 and also disposed across the second intake air passage 16 while passing through the second intake air passage 16.

The swirl throttle valve 52 is rotatably connected to the swirl throttle shaft 50 and has a plate shape of which a surface corresponds to a cross-section of the second intake air passage 16. Further, the swirl throttle valve 52 is disposed at the second intake air passage 16 and opens and closes the second intake air passage 16 while rotating together with the swirl throttle shaft 50 about the swirl throttle valve 50.

The actuator 30 rotates the Intake throttle shaft 40 and the swirl throttle shaft 50. In addition, the actuator 30 may be a driving force source of the rotations of the Intake throttle shaft 40 and the swirl throttle shaft 50, and the actuator 30 may be a motor.

The controller 60 controls the rotations of the Intake throttle shaft 40 and the swirl throttle shaft 50 by controlling the operation of the actuator 30. That is, the controller 60 controls the selective opening and closing of the first intake air passage 14 and the second intake air passage 16 by means of the intake air throttle valve 42 and the swirl throttle valve 52.

Figure 2:
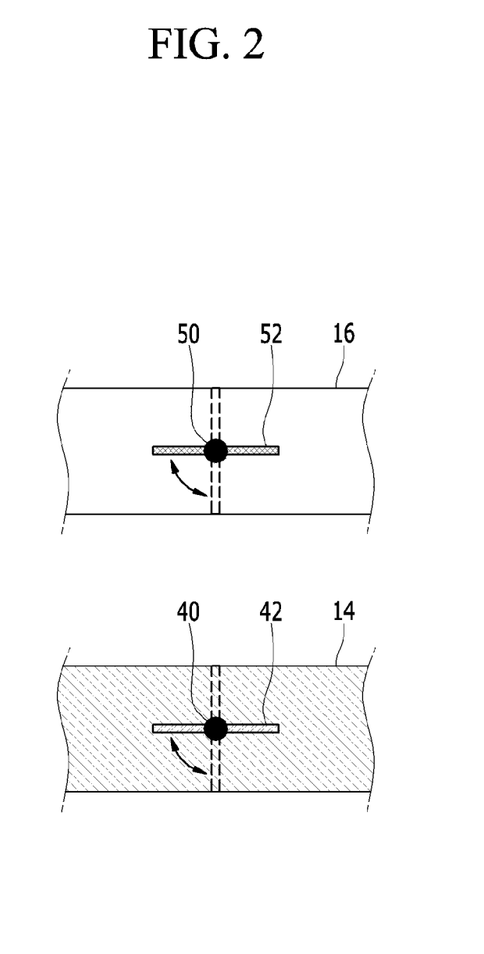
FIG. 2 is a view illustrating a configuration of an intake air throttle valve and a swirl throttle valve of an intake air control apparatus of an engine according to an exemplary embodiment of the present inventive concept.

FIG. 2 is a view illustrating a configuration of an intake air throttle valve and a swirl throttle valve of the intake air control apparatus of an engine according to an exemplary embodiment of the present inventive concept.

Referring to FIG. 2, the Intake throttle shaft 40 and the swirl throttle shaft 50 may pass through widthwise centers of the first intake air passage 14 and the second intake air passage 16, respectively. However, the present disclosure is not limited thereto, and configuration and arrangement of the Intake throttle shaft 40, the intake air throttle valve 42, the swirl throttle shaft 50, and the swirl throttle valve 52 may be implemented in various way based on the design of a person having ordinary skill in the art in order for the first intake air passage 14 and the second intake air passage 16 to be selectively opened and closed. In FIG. 2, the intake air throttle valve 42 in which the first intake air passage 14 is open and the swirl throttle valve 52 in which the second intake air passage 16 is open are illustrated by a solid line. The intake air throttle valve 42 in which the first intake air passage 14 is closed, and the swirl throttle valve 52 in which the second intake air passage 16 is closed are illustrated by a dotted line.

Hereinafter, an operation of the actuator 30 according to an exemplary embodiment of the present inventive concept will be described in detail with reference to FIGS. 3 to 5.

Figure 3:
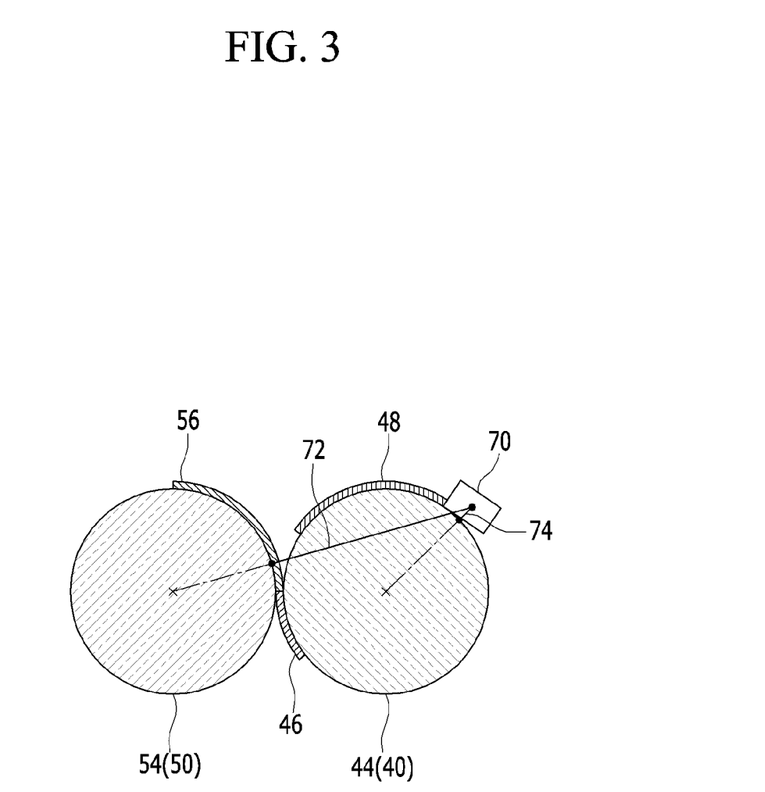
FIGS. 3 to 5 are views illustrating operations of an actuator of an intake air control apparatus of an engine according to an exemplary embodiment of the present inventive concept.
Figure 4:
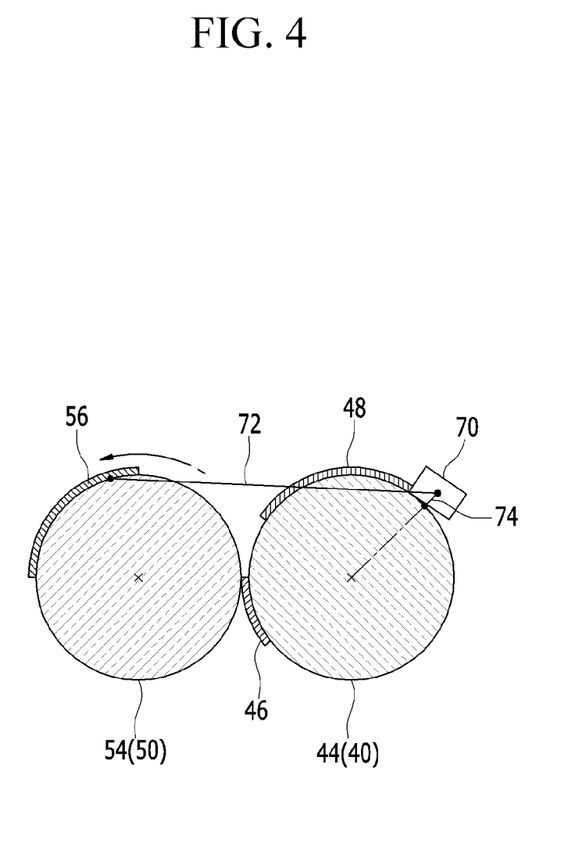
Figure 5:
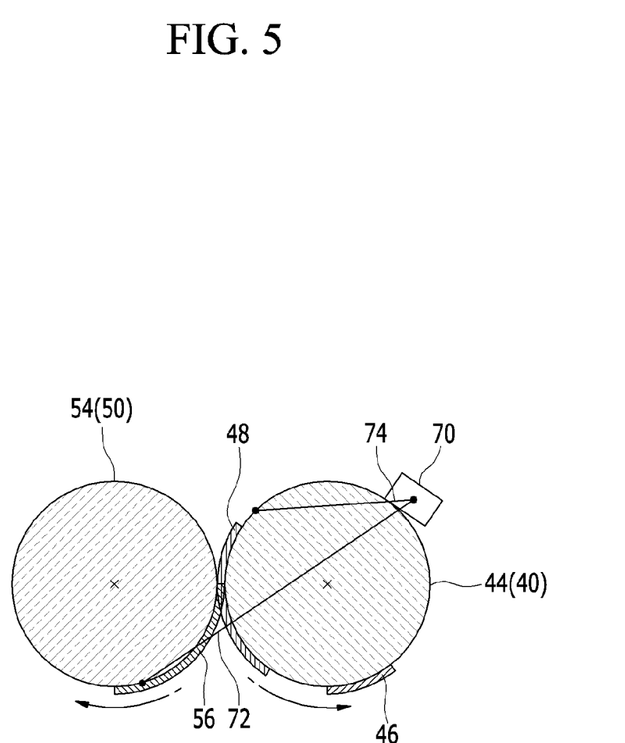

FIGS. 3 to 5 are views illustrating the operation of an actuator of the intake air control apparatus according to an exemplary embodiment of the present invention.

Referring to FIGS. 3 to 5, the actuator 30 according to the exemplary embodiment of the present inventive concept includes an intake air gear shaft 44, a first intake air gear former 46, a second intake air gear former 48, a swirl gear shaft 54, a first swirl gear former 56, and a stopper 70.

The intake air gear shaft 44 has a cylindrical shape. In addition, the intake air gear shaft 44 may be one end of the Intake throttle shaft 40 or may be disposed being concentric to the Intake throttle shaft 40, thereby integrally rotating.

The first intake air gear former 46 and the second intake air gear former 48 have gear teeth (not illustrated) formed thereon along an outer circumferential surface of the intake air gear shaft 44. In addition, the first intake air gear former 46 may be formed along the outer circumferential surface of the intake air gear shaft 44 corresponding to a predetermined angle on the outer circumference surface of the intake air gear shaft 44. Furthermore, the second intake air gear former 48 may be formed over a range of predetermined angles along the outer circumferential surface of the intake air gear shaft 44. The second intake air gear former 48 is spaced apart by a predetermined distance in the clockwise direction from the first intake air gear former 46.

The swirl gear shaft 54 has a cylindrical shape, and the swirl gear shaft 54 may be one end of the swirl throttle shaft 50 or may be disposed being concentric to the swirl throttle shaft 50, thereby integrally rotating. Furthermore, the swirl gear shaft 54 independently operates by a driving force of the actuator 30, and the intake air gear shaft 44 dependently operates by the rotation of the swirl gear shaft 54.

The first swirl gear former 56 have gear teeth (not illustrated) formed thereon along an outer circumferential surface of the swirl gear shaft 54 and the gear teeth of the first swirl gear 56 are disposed along the outer circumferential surface of the swirl gear shaft 54 corresponding to an angle of 90° on the outer circumference surface of the swirl gear shaft 54. In addition, since the swirl gear shaft 54 rotates in a state where the first swirl gear former 56 is engaged with the first intake air gear former 46 or the second intake air gear former 48, the intake air gear shaft 44 may rotate. The stopper 70 limits the rotation of the intake air gear shaft 44.

FIG. 3 illustrates a state where both the first intake air passage 14 and the second intake air passage 16 are open.

Referring to FIG. 3, a side end portion the first swirl gear former 56 at a clockwise direction is disposed to contact a side end portion of the first intake air gear former 46 at a clockwise direction where both the first intake air passage 14 and the second intake air passage 16 are open. In addition, a side end portion of the second intake air gear former 48 at a clockwise direction contacts the stopper 70.

When both the first intake air passage 14 and the second intake air passage 16 are open, a constant amount of intake air is supplied through the first intake air passage 14 and the second intake air passage 16 to the cylinder 22.

FIG. 4 illustrates a state where the first intake air passage 14 is open and the second intake air passage 16 is closed.

Referring to FIG. 4, the state where the first intake air passage 14 is open and the second intake air passage 6 is closed may be implemented since the swirl gear shaft 54 and the first swirl gear former 56 rotate by 90° in a counterclockwise direction as in FIG. 3. More specifically, since the swirl throttle shaft 50 rotates by 90° in one direction by the operation of the actuator 30 in a state where the first intake air passage 14 and the second intake air passage 16 are open, the second intake air passage 16 may be closed.

When the first swirl gear former 56 rotates in the counterclockwise direction in a state where a side end portion of the first swirl gear former 56 at the clockwise direction contacts a side end portion of the first intake air gear former 46 at the clockwise direction, the first swirl gear former 56 rotates while not being engaged with the first intake air gear former 46 or the second swirl gear former 48 due to a spaced-apart distance between the first intake air gear former 46 and the second intake air gear former 48.

In a case where the first intake air passage 14 is open and the second intake air passage 16 is closed by the swirl throttle valve 52, the swirl of the intake air supplied to the cylinder 22 is formed only through the first intake air passage 14. Here, the arrangement of the first intake air passage 14 for the intake air to easily swirl may be changed based on the design by a person having ordinary skill in the art.

FIG. 5 illustrates a state where both the first intake air passage 14 and the second intake air passage 16 are closed.

Referring to FIG. 5, the state where all the first intake air passage 14 and the second intake air passage 16 are closed may be implemented since the swirl gear shaft 54 and the first swirl gear former 56 rotate by 90° in the clockwise direction in the state as in FIG. 3. That is, the Intake throttle shaft 40 rotates by 90° in one direction since the swirl throttle shaft 50 rotates by 90° in an opposite direction based on the operation of the actuator 30 by means of the controller 60 in a state where both the first intake air passage 14 and the second intake air passage 16 are open. Therefore, the first intake air passage 14 and the second intake air passage 16 are closed.

When the first swirl gear former 56 rotates in the clockwise direction in a state that a side end portion of the first swirl gear former 56 at the clockwise direction contacts a side end portion of the first intake air gear former 46 at the clockwise direction, the first swirl gear former 56 pushes away the first intake air gear former 46 and at the same time becomes engaged with the second intake air gear former 48. Therefore, the Intake throttle shaft 40 rotates by as much as the rotational angle of the swirl throttle shaft 50. More specifically, the Intake throttle shaft 40 rotates by 90° in the counterclockwise direction when the swirl throttle shaft 50 rotates by 90° in the clockwise direction in a state where a side end portion of the first swirl gear former 56 at the clockwise direction contacts a side end portion of the first intake air gear former 46 at the clockwise direction.

Referring to FIG. 3 to FIG. 5, the first intake air former 46 is formed over a range of acute angles along an outer circumferential surface of the intake air gear shaft 44, and the second intake air gear former 48 is formed over an angle of 90° along an outer circumferential surface of the intake air gear shaft 44. However, the present disclosure is not limited thereto, and the angle where the first intake air gear former 46 is formed, the angle where the second intake air gear former 48 is formed, and the spaced-apart distance between the first intake air gear former 46 and the second intake air gear former 48 may be set so that at least one of the first intake air gear former 46 and the second intake air gear former 48 is continuously engaged with the first swirl gear former 56 while the first swirl gear former 56 rotates by 90° in the clockwise direction.

In a case where both the first intake air passage 46 and the second intake air passage 16 are closed by the intake air throttle valve 42 and the swirl throttle valve 52, the intake air supply to the cylinder 22 stops.

Assuming the positions of the components in a state as in FIG. 3 as initial positions, the intake air control apparatus of an engine according to an exemplary embodiment of the present inventive concept may be constituted so that the components may further include return springs 72 and 74 which return to an initial position in the states as in FIGS. 4 and 5.

Between the return springs 72 and 74, either one which is capable of returning to the initial positions the swirl gear shaft 54 and the first swirl gear former 56 is called a first return spring 72, and the other one which is capable of returning to the initial positions the intake air gear shaft 44, the first intake air gear former 46, and the second intake air gear former 48 is called a second return spring 74.

The first return spring 72 is fixed at the stopper 70 which is a fixture, and is connected to the swirl gear shaft 54. In addition, the first return spring 72 returns to the initial position of the swirl gear shaft 54 and the first swirl gear former 56 since the operation of the actuator 30 is released.

The first return spring 72 may be connected to the shortest distance portion of the swirl gear shaft 54 from the stopper 70 in the initial position states of the swirl gear shaft 54 and the first swirl gear former 56. Therefore, when the swirl gear shaft 54 rotates, the first return spring 72 is tensioned. In addition, as the operation of the actuator 30 is released, the first return spring 72 contracts, and the swirl gear shaft 54 and the first swirl gear former 56 return to the initial position.

The second return spring 74 is fixed at the stopper 70, which is a fixture, and is connected to the intake air gear shaft 44. In addition, since the operation of the actuator 30 is released, the second return spring 74 returns the intake air gear shaft 44, the first intake air gear former 46 and the second intake air gear former 48 to the initial positions.

The second return spring 74 may be connected to the shortest distance portion of the intake air gear shaft 44 from the stopper 70 in the initial position states of the intake air gear shaft 44, the first intake air gear former 46, and the second intake air gear former 48. Therefore, when the intake air gear shaft 44 rotates, the second return spring 74 is in tension. In addition, since the operation of the actuator 30 is released, the second return spring 74 contracts, and the intake air gear shaft 44, the first intake air gear former 46, and the second intake air gear former 48 return to the initial positions.

At this time, in case of the return to the initial position from the state as in FIG. 4 to the state as in FIG. 3, the side end portion of the first intake air gear former 46 at the clockwise direction limits the rotations in the clockwise directions where the first swirl gear former 56 returns to the initial position. That is, the first intake air gear former 46 serves as the stopper of the first swirl gear former 56. In addition, in case of the return to the initial position from the state as in FIG. 5 to the state as in FIG. 3, the stopper 70 limits the rotations of the clockwise direction where the first intake air gear former 46 returns to the initial position.

Here, the elastic force of the first return spring 72 is set to be smaller than the elastic force of the second return spring 74. The above-mentioned setting of the elastic force is performed in order for the first intake air gear former 46 to efficiently work as a stopper of the first swirl gear former 56 in case of the return to the initial position from the state as in FIG. 4 to the state as in FIG. 3, and in order to minimize the load between the engaged first swirl gear former 56 and second intake air gear former 48 in a case of the return to the initial position from the state as in FIG. 5 to the state as in FIG. 3.

Hereinafter, an operation of the actuator 30 according to another exemplary embodiment of the present inventive concept will be described in detail with reference to FIGS. 6 to 8.

Figure 6:
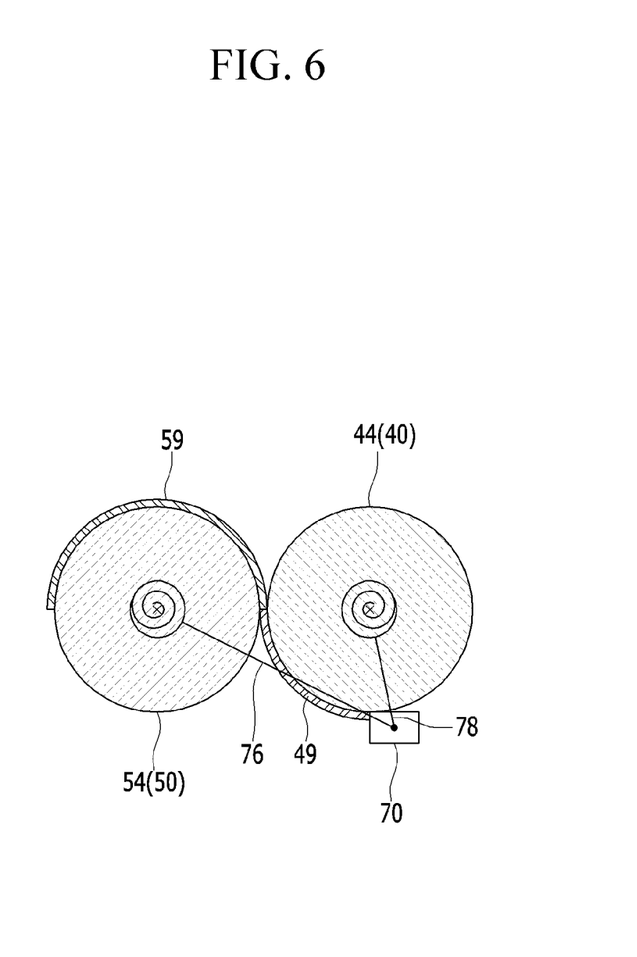
FIGS. 6 to 8 are views illustrating operations of an actuator of an intake air control apparatus of an engine according to another exemplary embodiment of the present inventive concept.
Figure 7:
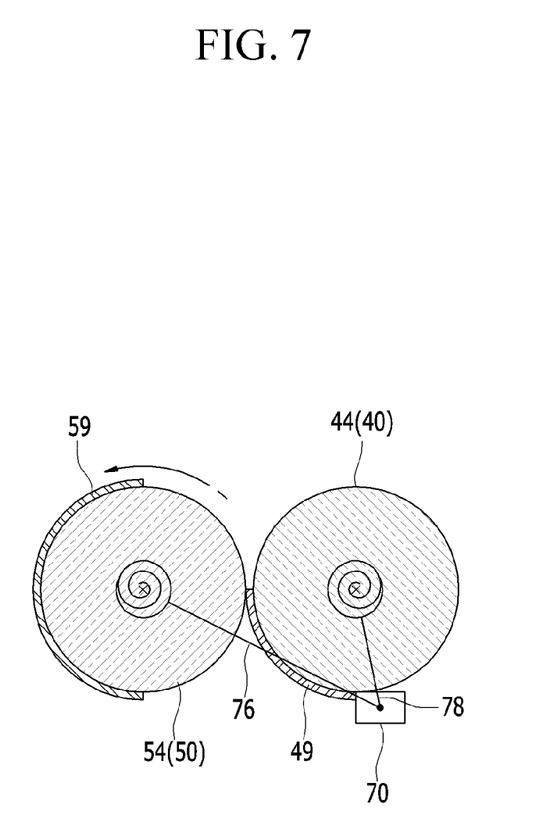
Figure 8:
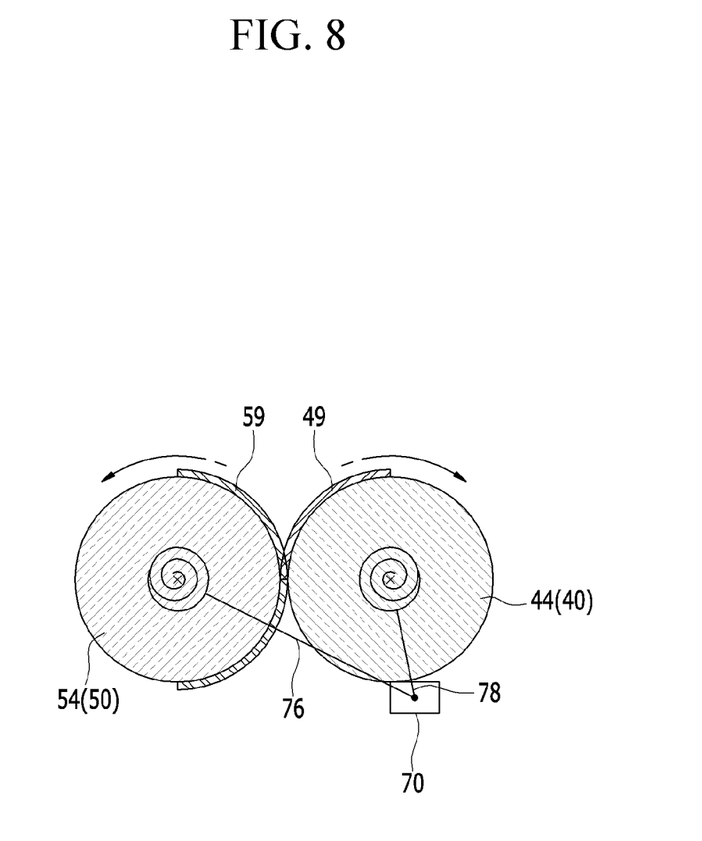

FIGS. 6 to 8 are views illustrating operations of the actuator of the intake air control apparatus of an engine according to another exemplary embodiment of the present inventive concept.

Referring to FIGS. 6 to 8, the actuator 30 according to another exemplary embodiment of the present inventive concept includes an intake air gear shaft 44, a third intake air gear former 49, a swirl gear shaft 54, a second swirl gear former 59, and a stopper 70.

In the description below, repeating descriptions of the same components as those which have been described earlier with reference to FIGS. 3 to 5 will be omitted.

The third intake air gear former 49 have the gear teeth (not illustrated) formed thereon along an outer circumferential surface of the intake air gear shaft 44. In addition, the gear teeth of the third intake air gear former 49 may be formed over along the outer circumferential surface of the intake air gear shaft 44 within a range of obtuse angles.

The second swirl gear former 59 have the gear teeth (not illustrated) formed thereon along an outer circumferential surface of the swirl gear shaft 54. In addition, the second swirl gear former 59 is formed along the outer circumferential surface of the swirl gear shaft 54 in a range of 180°. Further, since the swirl gear shaft 54 rotates in a state where the second swirl gear former 59 is engaged with the third intake air gear former 49, the intake air gear shaft 44 rotates.

FIG. 6 illustrates a state where both the first intake air passage 14 and the second intake air passage 16 are open.

Referring to FIG. 6, a side end portion of the second swirl gear former 59 at the clockwise direction contacts a side end portion of the third intake air gear former 49 at the clockwise direction in a state where both the first intake air passage 14 and the second intake air passage 16 are open. In addition, a side end portion of the third intake air gear former 49 at the counterclockwise direction contacts the stopper 70.

FIG. 7 illustrates a state where the first intake air passage 14 is open, and the second intake air passage 16 is closed.

Referring to FIG. 7, the state where the first intake air passage 14 is open and the second intake air passage 16 is closed may be implemented since the swirl gear shaft 54 and the second swirl gear former 59 rotate in the counterclockwise direction by 90° in FIG. 6. More specifically, the second intake air passage 16 may be closed since the swirl throttle shaft 50 rotates by 90° based on the operation of the actuator 30 by means of the controller 60 in a state where both the first intake air passage 14 and the second intake air passage 16 are open.

The second swirl gear former 59 rotates while not being engaged with the third intake air gear former 49 when the second swirl gear former 59 rotates in the counterclockwise direction in a state where a side end portion of the second swirl gear former 59 at the clockwise direction contacts a side end portion of the third intake air gear former 49 at the clockwise direction.

FIG. 8 illustrates a state where both the first intake air passage 14 and the second intake air passage 16 are closed.

Referring to FIG. 8, the state where both the first intake air passage 14 and the second intake air passage 16 are closed may be implemented since the swirl gear shaft 54 and the second swirl gear former 59 rotate by 270° in the counterclockwise direction in the state as in FIG. 6. That is, since the swirl throttle shaft 50 rotates by 270° based on the operation of the actuator 30 in a state where both the first intake air passage 14 and the second intake air passage 16 are open, the Intake throttle shaft 40 may rotate by 90° in the opposite direction. Therefore, the first intake air passage 14 and the second intake air passage 16 are closed.

The second swirl gear former 59 and the third intake air gear former 49 start to engage with each other when the second swirl gear former 59 rotates by 180° in the counterclockwise direction in a state where a side end portion of the second swirl gear former 59 at the clockwise direction contacts a side end portion of the third intake air gear former 49 at the clockwise direction. Therefore, when the second swirl gear former 59 further rotates in the counterclockwise direction with respect to the rotational angle of 180° in the counterclockwise direction of the second swirl gear former 59, the Intake throttle shaft 40 may rotate by as much as a rotational angle of the swirl throttle shaft 50. That is, the Intake throttle shaft 40 rotates by 90° in the clockwise direction when the swirl throttle shaft 50 rotates by 270° in the counterclockwise direction in a state where the side end portion of the second swirl gear former 59 at the clockwise direction contacts the side end portion of the third intake air gear former 49 at the clockwise direction.

Assuming that positions illustrated in FIG. 6 are the initial positions, the intake air control apparatus of an engine according to another exemplary embodiment of the present inventive concept may further include return springs 76 and 78 serving in order for the components to return to the initial positions in the states as in FIGS. 7 and 8.

Between the return springs 76 and 78, one of which serves to return the swirl gear shaft 54 and the second swirl gear former 59 to the initial positions is called a third return spring 76, and the other one which serves to return the intake air gear shaft 44 and the third intake air gear former 49 to the initial positions is called a fourth return spring 78.

The third return spring 76 is fixed at the stopper 70 and is connected to the swirl gear shaft 54. In addition, since the operation of the actuator 30 is released, the third return spring 76 returns the swirl gear shaft 54 and the second swirl gear former 59 to the initial positions.

The third return spring 76 may be a torsion spring which may wound around the swirl gear shaft 54 from the stopper 70. Therefore, the swirl gear shaft 54 and the second swirl gear former 59 return to the initial positions by an elastic force of the third return spring 76 since the operation of the actuator 30 is released in a state where the swirl gear shaft 54 rotates in order for the third return spring 76 to be further wound around the swirl gear shaft 54.

The fourth return spring 78 is fixed at the stopper 70 and is connected to the intake air gear shaft 44. In addition, the fourth return spring 78 returns the intake air gear shaft 44 and the third intake air gear former 49 to the initial positions since the operation of the actuator 30 is released.

The fourth return spring 78 may be a torsion spring which may wound around the intake air gear shaft 44 from the stopper 70. Therefore, the intake air gear shaft 54 and the third intake air gear former 49 return to the initial positions by an elastic force of the fourth return spring 78 since the operation of the actuator 30 is released in a state where the intake air gear shaft 44 rotates in order for the fourth return spring 78 to be further wound around the intake air gear shaft 44.

At this time, in case of the return from the state as in FIG. 7 to the state as in FIG. 6, the side end portion of the third intake air gear former 49 limits the rotation of the clockwise direction where the second swirl gear former 59 returns to the initial position. That is, the third intake air gear former 49 serves as a stopper of the second swirl gear former 59. In addition, in case of the return from the state as in FIG. 8 to the state as in FIG. 6, the stopper 70 limits the rotation of the counterclockwise direction where the third intake air gear former 49 returns to the initial position.

Here, the elastic force of the third return spring 76 is set to be smaller than the elastic force of the fourth return spring 78. The elastic force is set in order for the third intake air gear former 49 to efficiently work as the stopper of the second swirl gear former 59 in case of the return from the state as in FIG. 7 to the state as in FIG. 6 and at the same time to minimize any load between the second swirl gear former 59 and the third gear former 49 which are engaged with each other in case of the return from the state as in FIG. 8 to the state as in FIG. 6.

The first, second, third, and fourth return springs 72, 74, 76, and 78 may be adopted by a person having ordinary skill in the art as necessary, and since the return to the initial positions are performed based on the operation of the actuator 30 in accordance with a control of the controller 60, the first, second, third, and fourth return springs 72, 74, 76, and 78 may not be required.

The clockwise direction and the counterclockwise direction in the exemplary embodiments of the present inventive concept may be defined based on the drawings and may be changed based on the viewing direction or the arrangement of the components.

As described above, according to the exemplary embodiments of the present inventive concept, since the intake air throttle valve 42 and the swirl throttle valve 52 are operated by one actuator 30, the configuration becomes simple, manufacturing cost may be saved, and the weight decreases, and fuel efficiency is improved. In addition, since the throttle valve is eliminated from the inlet port 12 of the Intake manifold 10 formed for the intake air to be inputted into the Intake manifold 10, the layout of the surrounding components of the inlet port of the Intake manifold 10 may be improved, and since it is easy to change the position of the inflow of the recirculation exhaust gas to the upstream in the Intake manifold 1, the distribution performance of the recirculation exhaust gas between the cylinders 22 may be improved. Furthermore, since a cross-section of the intake air throttle valve 42 decreases, reaction performance of the intake air control may be improved.

While this inventive concept has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An intake air control apparatus for an engine, comprising:
   an Intake manifold guiding intake air into a plurality of engine cylinders;
   a plurality of first intake air passages communicating with each of the cylinders via the Intake manifold;
   a plurality of second intake air passages disposed in parallel with the plurality of first intake air passages and communicating with each of the cylinders via the Intake manifold;
   an Intake throttle shaft passing through each of the first intake air passages;
   an intake air throttle valve disposed inside the first intake air passages, the intake air throttle valve rotating together with the Intake throttle shaft and opening and closing the first intake air passage;
   a swirl throttle shaft passing though the plurality of second intake air passages;
   a swirl throttle valve disposed inside the second intake air passages, the swirl throttle valve rotating together with the swirl throttle shaft and opening and closing the second intake air passages;
   an actuator configured to rotate selectively the Intake throttle shaft and the swirl throttle shaft to open or close the first intake air passages or the second intake air passages;
   a controller configured to control the actuator;
   a swirl gear shaft disposed at one end portion of the swirl throttle shaft or disposed to be concentric to the swirl throttle shaft, the swirl gear shaft rotating integrally together with the swirl throttle shaft and independently operated by a driving force of the actuator;
   an intake air gear shaft disposed at one end portion of the Intake throttle shaft or disposed to be concentric to the Intake throttle shaft, the intake air gear shaft rotating integrally together with the intake throttle shaft and dependently operated by the rotation of the swirl gear shaft; and
   a stopper limiting the rotation of the intake air gear shaft.

2. The apparatus of claim 1, wherein a swirl occurs by the intake air which is supplied through only the first intake air passages to the cylinders when the swirl throttle valve closes the second intake air passages and the intake air throttle valve opens the first intake air passages by the actuator.

3. The apparatus of claim 1, wherein the swirl gear shaft and the intake air gear shaft have cylindrical shapes,
   gear teeth are formed along an outer circumferential surface of the swirl gear shaft corresponding to an angle of 90° on the outer circumference surface of the swirl gear shaft,
   gear teeth are formed along a first portion of an outer circumferential surface of the intake air gear shaft corresponding to a predetermined angle on the outer circumference surface of the intake air gear shaft and gear teeth are further formed along a second portion in a predetermined range at a predetermined spaced-apart distance from the first portion, and
   the intake air gear shaft rotates as the swirl gear shaft rotates since the gear teeth of the swirl gear shaft are engaged with the gear teeth of the first portion or the second portion of the intake air gear shaft.

4. The apparatus of claim 3, wherein, when both the first intake air passages and the second intake air passages are open, a side end portion of the gear teeth of the swirl gear shaft at a clockwise direction contacts a side end portion of the gear teeth of a first portion of the intake air gear shaft at the clockwise direction, the gear teeth of a second portion of the intake air gear shaft are spaced apart by a predetermined distance in the clockwise direction from the gear teeth of the first portion of the intake air gear shaft, and the side end portion of the gear teeth of the second portion of the intake air gear shaft contacts the stopper.

5. The apparatus of claim 4, wherein the first intake air passage is open and the second intake air passage is closed since the swirl gear shaft rotates by 90° in a counterclockwise direction when both the first intake air passage and the second intake air passage are open.

6. The apparatus of claim 5, wherein the gear teeth of the swirl gear shaft rotate and disengaged with the gear teeth of the intake air gear shaft due to the spaced-apart distance between the gear teeth of the first portion of the intake air gear shaft and the gear teeth of the second portion of the intake air gear shaft when the swirl gear shaft rotates in the counterclockwise direction.

7. The apparatus of claim 4, wherein, when the swirl gear shaft rotates by 90° in the clockwise direction and both the first intake air passage and the second intake air passage are open, both the first intake air passage and the second intake air passage are closed since the intake air gear shaft rotates by 90° in the counterclockwise direction and the gear teeth of the swirl gear shaft push away the gear teeth of the first portion of the intake air gear shaft and simulataneously engage with the gear teeth of the second portion.

8. The apparatus of claim 1, wherein the swirl gear shaft and the intake air gear shaft return to initial positions, in which both first intake air passage and second intake air passage are open, by the driving force of the actuator when the swirl gear shaft and the intake air gear shaft rotate to a position different from the initial positions.

9. The apparatus of claim 1, wherein, when the swirl gear shaft and the intake air gear shaft return to initial positions, in which both the first intake air passage and the second intake air passage are open, by the return spring when the driving force of the actuator is released when the swirl gear shaft and the intake air gear shaft rotate to a position different from the initial positions.

10. The apparatus of claim 9, wherein the return spring comprises one return spring returning the swirl gear shaft to the initial position, and another return spring returning the intake air gear shaft to the initial position.

11. The apparatus of claim 10, wherein the one return spring is fixed at the stopper and is connected to a shortest distance portion of the swirl gear shaft from the stopper in an initial position state of the swirl gear shaft, the other return spring is fixed at the stopper and is connected to a shortest distance portion of the intake air gear shaft from the stopper in an initial position state of the intake air gear shaft, the one return spring is tensioned since the swirl gear shaft rotates to a position different from the initial position and is contracted since the driving force of the actuator is released, thereby retuning the swirl gear shaft to the initial position, and the other return spring is tensioned since the intake air gear shaft rotates to a position different from be at the initial position and is contracted since the driving force of the actuator is released, thereby returning the intake air gear shaft to the initial position.

12. The apparatus of claim 10, wherein the one return spring is a torsion spring wound around the swirl gear shaft and returns the swirl gear shaft to the initial position as the driving force of the actuator is released when the swirl gear shaft rotates to a position different from the initial position, and the other return spring is a torsion spring wound around the intake air gear shaft and returns the intake air gear shaft to the initial position since the driving force of the actuator is released when the intake air gear shaft rotates to a position different from the initial position.

13. The apparatus of claim 4, wherein the swirl gear shaft and the intake air gear shaft return to initial positions, in which both the first intake air passage and the second intake air passage are open, when the swirl gear shaft and the intake air gear shaft rotate to a position different from the initial positions, the stopper contacts the side end portion of the gear teeth of the second portion of the intake air gear shaft at the clockwise direction and limits the rotation of the intake air gear shaft, and the side end portion of the gear teeth of the first portion of the intake air gear shaft at the clockwise direction contacts the side end portion of the gear teeth of the swirl gear shaft at the clockwise direction and limits the rotation of the swirl gear shaft.

14. The apparatus of claim 1, wherein the swirl gear shaft and the intake air gear shaft have cylindrical shapes, gear teeth are formed along an outer circumferential surface of the swirl gear shaft corresponding to an angle of 90° on the outer circumference surface of the swirl gear shaft, gear teeth are formed along an outer circumferential surface of the intake air gear shaft corresponding to an obtuse angle on the outer circumference surface of the intake air gear shaft, and the intake air gear shaft rotates since the swirl gear shaft rotates while the gear teeth of the swirl gear shaft are engaged with the gear teeth of the intake air gear shaft.

15. The apparatus of claim 14, wherein, when both the first intake air passage and the second intake air passage are open, the side end portion of the gear teeth of the swirl gear shaft at the clockwise direction contacts the side end portion of the gear teeth of the intake air gear shaft at the clockwise direction, and a side end portion of the gear teeth of the intake air gear shaft at a counterclockwise direction contacts the stopper.

16. The apparatus of claim 15, wherein when the first intake air passage is open and the second intake air passage is closed, the first intake air passage and the second intake air passage are open since the swirl gear shaft rotates by 90° in the counterclockwise direction.

17. The apparatus of claim 16, wherein the gear teeth of the swirl gear shaft rotate and are disengaged with the gear teeth of the intake air gear shaft when the swirl gear shaft rotates in the counterclockwise direction.

18. The apparatus of claim 15, wherein when the swirl gear shaft rotates by 270° in the counterclockwise direction and both the first intake air passage and the second intake air passage are open, both the first intake air passage and the second intake air passage are closed since the intake air gear shaft rotates by 90° in the counterclockwise direction while the swirl gear shaft further rotates by 90° in the counterclockwise direction since the gear teeth of the swirl gear shaft are engaged with the gear teeth of the intake air gear shaft while the swirl gear shaft rotates by 180° in the counterclockwise direction.

* * * * *